United States Patent [19]

Beckwith

[11] Patent Number: 5,762,848
[45] Date of Patent: Jun. 9, 1998

[54] METHOD OF ADJUSTING CHOKE GAP OF PLASTIC EXTRUDER APPARATUS

[75] Inventor: Robert W. Beckwith, Cummaquid, Mass.

[73] Assignee: Sencorp Systems, Inc., Hyannis, Mass.

[21] Appl. No.: 735,002

[22] Filed: Oct. 22, 1996

Related U.S. Application Data

[60] Division of Ser. No. 349,524, Dec. 5, 1994, Pat. No. 5,622,732, which is a continuation-in-part of Ser. No. 45,477, Apr. 13, 1993, Pat. No. 5,462,423.

[51] Int. Cl.$^6$ .................................................. B29C 47/12
[52] U.S. Cl. .......................... 264/176.1; 264/51; 425/466; 425/467
[58] Field of Search ............................. 425/466, 467; 264/51, 176.11

[56] References Cited

U.S. PATENT DOCUMENTS

| | | | |
|---|---|---|---|
| 3,491,406 | 1/1970 | Davidson | 425/466 |
| 3,492,694 | 2/1970 | Morin | 425/466 |
| 3,767,346 | 10/1973 | Mihalik | 425/378 |
| 3,775,035 | 11/1973 | Scotto et al. | 425/141 |
| 3,840,318 | 10/1974 | Solop | 425/466 |
| 3,899,276 | 8/1975 | Sokolow | 425/380 |
| 3,973,890 | 8/1976 | Porter et al. | 425/144 |
| 3,984,508 | 10/1976 | Solop | 264/40.1 |
| 4,057,385 | 11/1977 | Yazaki et al. | 425/466 |
| 4,201,534 | 5/1980 | Phipps | 425/461 |
| 4,212,620 | 7/1980 | McLaren | 425/381 |
| 4,298,325 | 11/1981 | Cole | 425/466 |
| 4,362,683 | 12/1982 | Otsuka et al. | 264/167 |
| 4,425,290 | 1/1984 | Upmeier | 264/40.1 |
| 4,548,570 | 10/1985 | Hahn et al. | 425/141 |
| 4,749,531 | 6/1988 | Borger et al. | 264/40.6 |
| 4,793,788 | 12/1988 | Borger et al. | 425/141 |
| 4,882,104 | 11/1989 | Dobrowsky | 264/40.1 |
| 5,051,082 | 9/1991 | Hattori et al. | 425/466 |
| 5,102,602 | 4/1992 | Ziegler | 264/209.2 |
| 5,108,683 | 4/1992 | Anand | 264/174 |
| 5,116,211 | 5/1992 | Shinmoto | 425/141 |
| 5,253,992 | 10/1993 | Reifenhauser | 425/466 |
| 5,284,430 | 2/1994 | Tomic et al. | 425/466 |
| 5,462,423 | 10/1995 | Beckwith | 425/141 |
| 5,622,732 | 4/1997 | Beckwith | 425/466 |

FOREIGN PATENT DOCUMENTS

| | | | |
|---|---|---|---|
| 0363716 | 4/1990 | European Pat. Off. | 425/466 |
| 61-2522 | 1/1986 | Japan | 425/466 |

*Primary Examiner*—Allan R. Kuhns
*Attorney, Agent, or Firm*—Richard P. Crowley

[57] ABSTRACT

An extruder die apparatus, system and method for the extrusion of a thermoplastic material, which die apparatus has an adjustable choke ring. The apparatus comprises an extruder housing having an axial bore for the extrusion of thermoplastic material therethrough from the inlet to the outlet of the bore, an inner die lip and an outer die lip about the bore and within the housing, the lips forming a concentric die gap passageway for the extrusion of a thermoplastic material from the one to the other end of the die, and a choke gap within said thermoplastic material flow passageway having a movably positioned choke ring. The choke ring has a plurality of individual, axially extending castellations thereon, some having oval receiving holes therein. These separate, castellated sections may be adjusted incrementally and independently by a plurality of eccentric bolts extending through the housing and the oval receiving holes, to provide selected areas within the choke gap having a restricted cross section thermoplastic material flow area. The restricted choke gap provides for an improved distribution of the thermoplastic material being extruded through the choke gap prior to being extruded through the die gap.

18 Claims, 5 Drawing Sheets

5,762,848

1

METHOD OF ADJUSTING CHOKE GAP OF PLASTIC EXTRUDER APPARATUS

REFERENCE TO PRIOR APPLICATIONS

This application is a divisional application of U.S. Ser. No. 08/349,524, filed Dec. 5, 1994, now U.S. Pat. No. 5,622,732, issued Apr. 22, 1997 which is a continuation-in-part of U.S. Ser. No. 08/045,477, filed Apr. 13, 1993, now U.S. Pat. No. 5,462,423 issued Oct. 31, 1995.

BACKGROUND OF THE INVENTION

Extrusion die apparatus employed for the extrusion of thermoplastic material, more particularly foamable thermoplastic material, such as, for example, but not limited to, olefinic materials like polyethylene or polystyrene, employ inner and outer die lips. The inner and outer die lips have a one and the other end, and at the one end form a concentric die gap for the extrusion of a concentric thermoplastic material, and which inner and outer die lips form therebetween a thermoplastic flow passageway, generally extending axially through the inner and outer die lips. The flow passageway at the one end is usually angularly disposed upwardly, and which angular upward flow area includes a choke area, which comprises a cross-sectional flow restriction area for the extruded thermoplastic material. Choke areas are particularly employed in connection with extrusion die apparatus to provide for the mixing and distribution of the hot, melted, extruded plastic as it passes from the inlet of the extruded die apparatus toward the die gap. Some die apparatus employ extrusion passageway sections which have designated spider legs and which tend to produce spider marks in the extruded thermoplastic material if the choke area is not employed to compress the extruded thermoplastic material for better distribution.

Generally, the choke area is tapered slightly to restrict the extruded thermoplastic material, such as the foamable material, with minimum increase of pressure drop, since a large increase in pressure drop might cause prefoaming within the die passageway, where foamable thermoplastic material is being extruded. The choke area is concentric where the extruded thermoplastic material is to be concentrically extruded through a concentric die gap, so that the choke passageway, cross-sectionalized, is generally uniform, otherwise there is unequal extruded thermoplastic flow material, so that the flow is not concentric from the die gap. Generally, in order to provide for a concentric flow, a threaded bolt or screw adjusting means is employed adjacent the outer die lip to permit peripheral adjustment of the position of the outer die lip about the inner die lip through a plurality of bolts on the outer die lips. In the past, certain choke rings have, in fact, been used to adjust the choke area or gaps. However, such choke rings have not proven satisfactory, and generally have failed to provide for the accurate control of concentricity of the flow through the choke area.

It is therefore desirable to provide for a new and improved extrusion die apparatus particularly for use with foam sheet extrusion, and an extrusion die system and method containing an easily adjustable choke gap and which permits adjustment also of concentricity of the choke gap.

SUMMARY OF THE INVENTION

The invention relates to an extrusion die apparatus and extrusion system and method wherein a choke area may be easily and effectively adjusted, and which permits the adjustment of the concentricity of the choke gap.

2

The invention concerns a die extrusion apparatus for the extrusion of a thermoplastic material, which apparatus has an adjustable choke gap, and comprises an extruder housing having an axial inner bore for the extrusion of thermoplastic material extruded from the inlet to the outlet of the bore. The apparatus includes an inner die lip, and an outer die lip about the inner die lip and about the bore, each having an one and the other end. The inner and outer die lips form at the one end a concentric die gap which may be adjusted at a position on the outer die lip, which is a screw-type or bolt-type adjustment, and is provided for the extrusion of a thermoplastic material, such as foam sheet material. The inner and outer die lips also form a passageway generally from the inlet end and toward the outlet of the die gap, and then generally for at least a portion being concentric about the bore, generally arcuate and having at or toward the outlet end a downwardly extending passageway. The extending passageway includes a choke area or choke gap, which fits the cross-sectional area about the periphery. The choke gap within the flow passageway provides for the improved distribution of the hot, thermoplastic material being extruded through the die apparatus, particularly where spider legs are employed in the die apparatus, and such a choke area helps remove the spider marks in the extruded foam material caused by said spider legs.

The die extrusion apparatus includes an axial, concentric slot in the outer die lip toward the outer end generally adjacent to and extending into the choke gap. The die extrusion apparatus also includes a choke ring means, which is radially positioned within the peripheral slot having a selected clearance in the slot, such as, for example, of 0.010 to 0.030 of an inch, and which choke ring may be moved axially as desired, generally up to about 0.25 inch, e.g. to ⅛" toward or into the choke gap. The choke ring typically includes a face surface area which is rounded, so that the rounded face surface area is facing the direction of the extrusion flow path, in place within the choke gap.

The axial movement of each section of the choke ring means is accomplished in one embodiment by having each eccentric bolt pass through a hole in the choke ring.

The die extrusion apparatus includes a plurality of separate, sectioned choke ring adjusting means, generally uniformly positioned about the periphery of the outer die lip extending toward and into contact with the choke ring means, to permit the axial movement of the choke ring in each separate section to adjust the choke gap peripherally about the said flow passageway. The axial adjusting means may vary in number, but generally would include from about 4 to 8 or more, which are generally uniformly positioned about the peripheral choke ring means, and may, for example, be bolts extending radially inward, such as eccentric bolts to provide for the axial movement and adjustment of the choke ring means by the turning of the bolt.

These bolts may each also contain markings such as on the outer head, so that each adjustment bolt may be separately adjusted by a user and the markings notated to provide for a concentric adjustment of the flow gap. The adjustment means also allows for a slight flexing; by mean of a plurality of outwardly extending castellations on the opposite surface of the choke ring means, corresponding to and having thereon selected alternating castellations the oval receiving holes for the eccentric threaded adjustment bolt ends. The castellations allow for axial flexing of the choke ring means in each particular section, providing for alleviation of any metal strain on the choke ring. Thus, the choke ring is positioned generally axially within the slot adjacent the choke gap, and is adjustable slidably within the elongated slot by axial adjustment means, such as bolts in contact with the choke ring and areas thereof, which bolt extends outside and has markings thereon to determine the amount of each adjustment.

The bolt, at one end, may have an eccentric start or end so as also to force the choke ring in each particular area generally axially backward and forward, therefore to position the metal choke ring within the clearance admitted by the said slot, so as to adjust the entire concentric choke gap as desired by the turning of the bolts. Thus, the positioning of the choke ring provides metal flexing and twisting within the clearance, increasing or decreasing the choke gap in a particular section. The amount of choking is limited by the clearance provided within the slot, and in addition may also be adjusted due to the flexibility of the metal of the choke ring, wherein the choke ring is comprised of a slightly flexible steel. By the use of a threaded bolt, the axial adjustment of the choke ring can be made in each peripheral section to increase or decrease the choke gap; for example, to increase the choke gap when the pressure drop is too high to get prefoaming material, or to decrease the choke gap as desired to provide redistribution to prevent spider marks.

Extrusion die apparatus is useful for all types of extrudable thermoplastic material, but particularly for foamable thermoplastic material, such as polyethylene or polystyrene. For example, with polyethylene, the choke gap may tend to cause prefoaming; while, for example, in employing polystyrene the same choke gap is usually smaller, as polystyrene is a different, harder type of thermoplastic material. Thus, by use of an axially adjustable choke ring, the choke ring can be adjusted and controlled in the various peripheral sections for a different thermoplastic material. Both the choke area at the choke gap cross sectional area, and the concentricity that is the overall average gap concentricity around the entire choke gap can be adjusted by multiple point adjustment, providing for very careful control of the concentricity of the choke gap.

Extrusion die apparatus may be employed as described in the parent application in connection with a ring containment means, such as an oil ring containing heat transfer oil which may be heated or cooled, and which is placed about the outer die lip in a heat-conductive relationship thereto, and with valve control means placed in various sections generally uniformly about the oil ring containment means within an oil passageway. The oil passageway is generally adjacent the inner surface of the inner oil ring, so that the flow of heat transfer oil may be individually adjusted around the periphery of the outer die lip and adjacent the die gap. The temperature on the surface of the outer die lip, and thus the viscosity of the extruded material at the die gap may be adjusted, all as set forth in the parent application.

The die extrusion apparatus may also include a plurality of spider legs supporting means, and includes screw adjustment means about the periphery of the outer die lip to provide for a coarse adjustment of the die gap by individual threaded adjustments about the periphery of the outer die lip. The apparatus may include other peripheral heaters, such as ceramic heaters.

The invention will be described for the purposes of illustration only in connection with certain embodiments; however, it is recognized that various changes, modifications, additions and improvements may be made to the illustrated embodiments by those persons skilled in the art, without departing from the spirit and scope of the invention.

DESCRIPTION OF THE EMBODIMENTS

Figure 1:
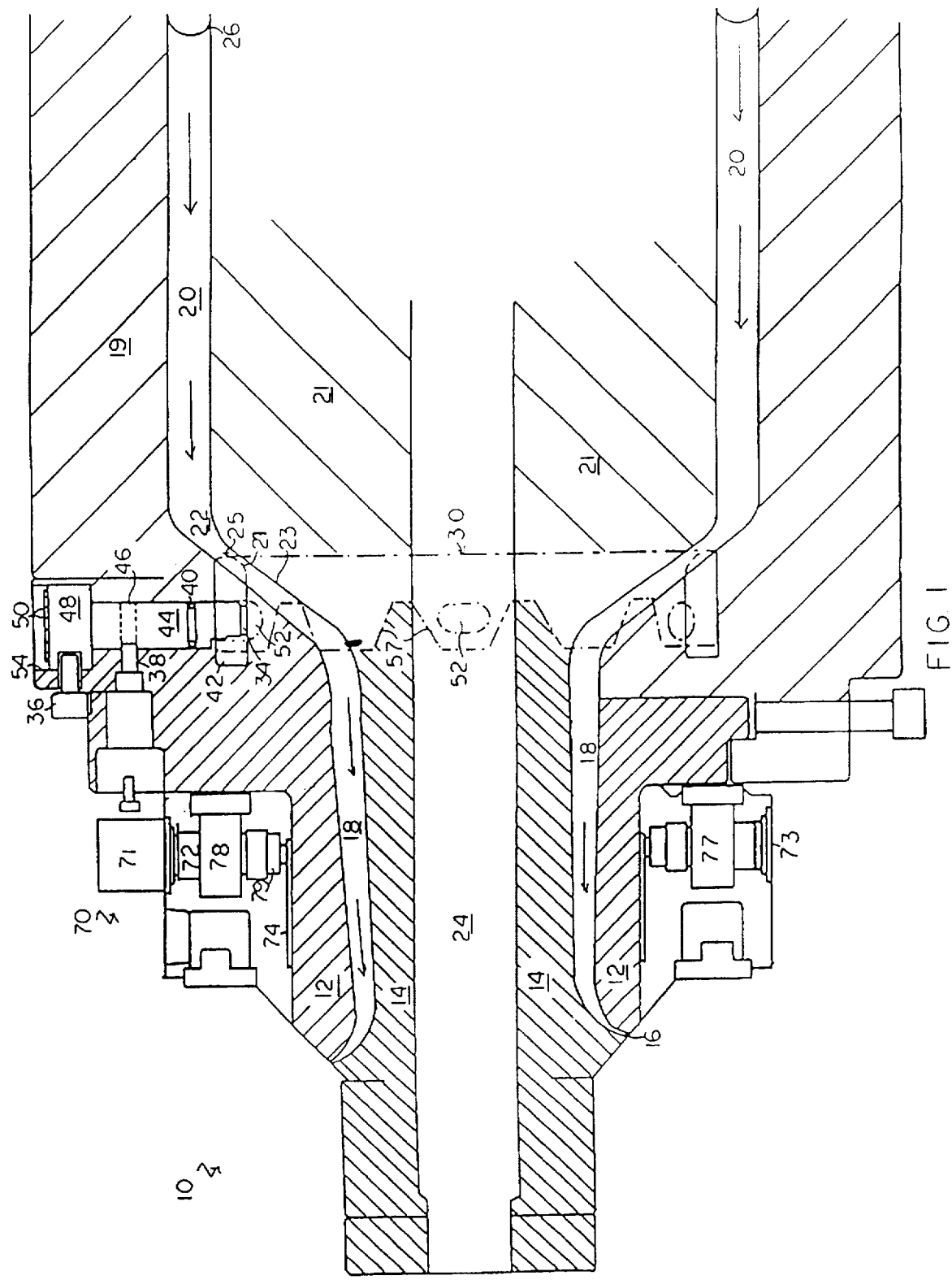
FIG. 1 is a sectional view of the die apparatus of the invention within an extrusion die apparatus.

FIG. 1 shows a sectional view of an extrusion die apparatus 10 with an inlet 28 having spider legs 26 attached thereto leading into an upper extrusion passageway 20 with an angularly downwardly extending choke gap 22 leading therefrom. The choke gap leads to an outer die lip 12 and an inner die lip 14 forming a lower extrusion passageway 18 and a die gap outlet 16. The spider legs 26 connect the outer die lip assembly 19 to the inner die lip assembly 21 and the core 24 of the extrusion device. An annular choke ring 30 extends concentrically around the inner 14 and outer 12 die lips axially within an annular slot 42 in a movable position to restrict the extrusion flow within the choke gap 22 as desired. The outer die lip assembly 19 has a plurality of spaced apart, independently controlled, sectored choke ring adjusting bolts 32 shown within a bolt passageway 54 and having a bolt head 48 with markings 50 thereon at the one end and an eccentric end 34 at the other end, extending through the annular slot 42 into one of a plurality of oval receiving holes 52 on the annular choke ring 30 at selected intervals, to provide for axial, slidable movement of the choke ring segments into the choke gap 22 as desired. The bolt 32 has a turning bolt 36 on the head 48 to provide for the turning of the bolt head to adjust the eccentric thread end 34 and a securing bolt 38 is positioned within a groove 46 on the bolt neck 44 to prevent the ejection of the bolt 32 from the bolt passageway 54 due to pressure rising from the extruded foam. Bolt neck 44 further has an o-ring seal 40 to prevent leaking in the bolt passageway 54.

FIG. 1 also shows an outer die lip temperature adjustment means 70 with a plurality of valve passageways 72 having a heat transfer oil therein and having an inner circumferential surface 74 about and in a heat-conductive relationship with the outer die lip 12. The temperature control means 70 has annular first and second flow channels 78 and 77 for the circulation of heat transfer oil, an oil inlet 79 for introduction into the first channel 78 and into the oil circulation passageway 74 for the circulation of heat transfer oil therein, and an oil outlet 73 for the withdrawal of circulated oil from the second channel 77, and a control valve means 71 for the independent adjustment of each valve passageway 72.

Figure 2:
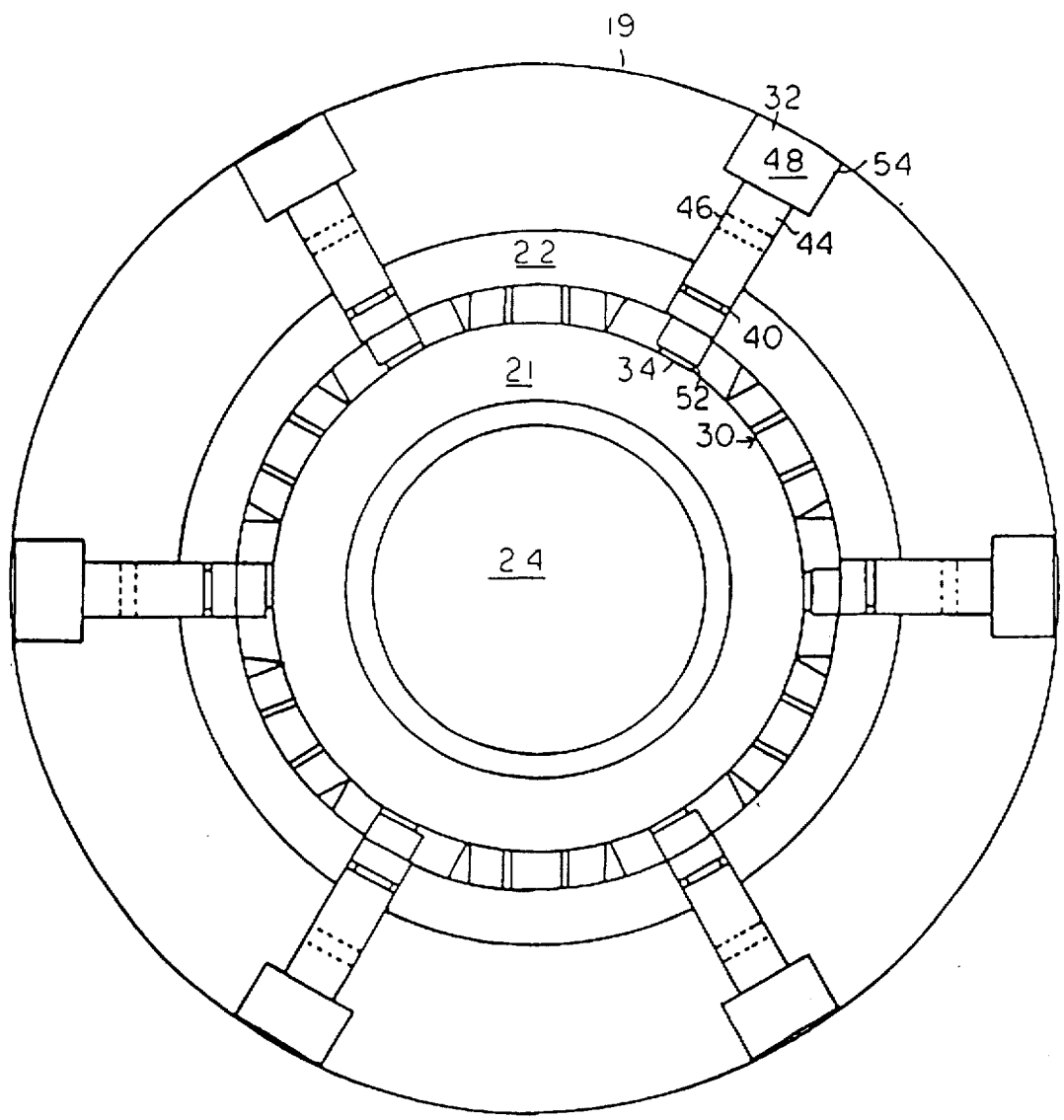
FIG. 2 is a cross-sectional view of the choke ring apparatus of the invention cut along lines 1—1.

FIG. 2 shows a cross-sectional view of the concentric choke ring apparatus of the invention 30 with the inner core 24, and the concentric choke gap 22. The choke ring apparatus 30 shows annular slots 42 having bolts 32 within bolt passageways 54 adjacent the choke ring 30, with the eccentric bolt ends 34 extending through the annular slots 42 into the choke ring oval receiving holes 52. The rotation of the bolt heads 34 within the holes 52, provides for movement of the selected segments of the choke ring 30 in an axial, slidable, inward manner into the choke gap 22. The bolt 32 is shown within the outer die lip assembly 19, the bolt neck 44 showing a groove 46 for the securing bolt 38 and also showing the o-ring seal 40.

Figure 3:
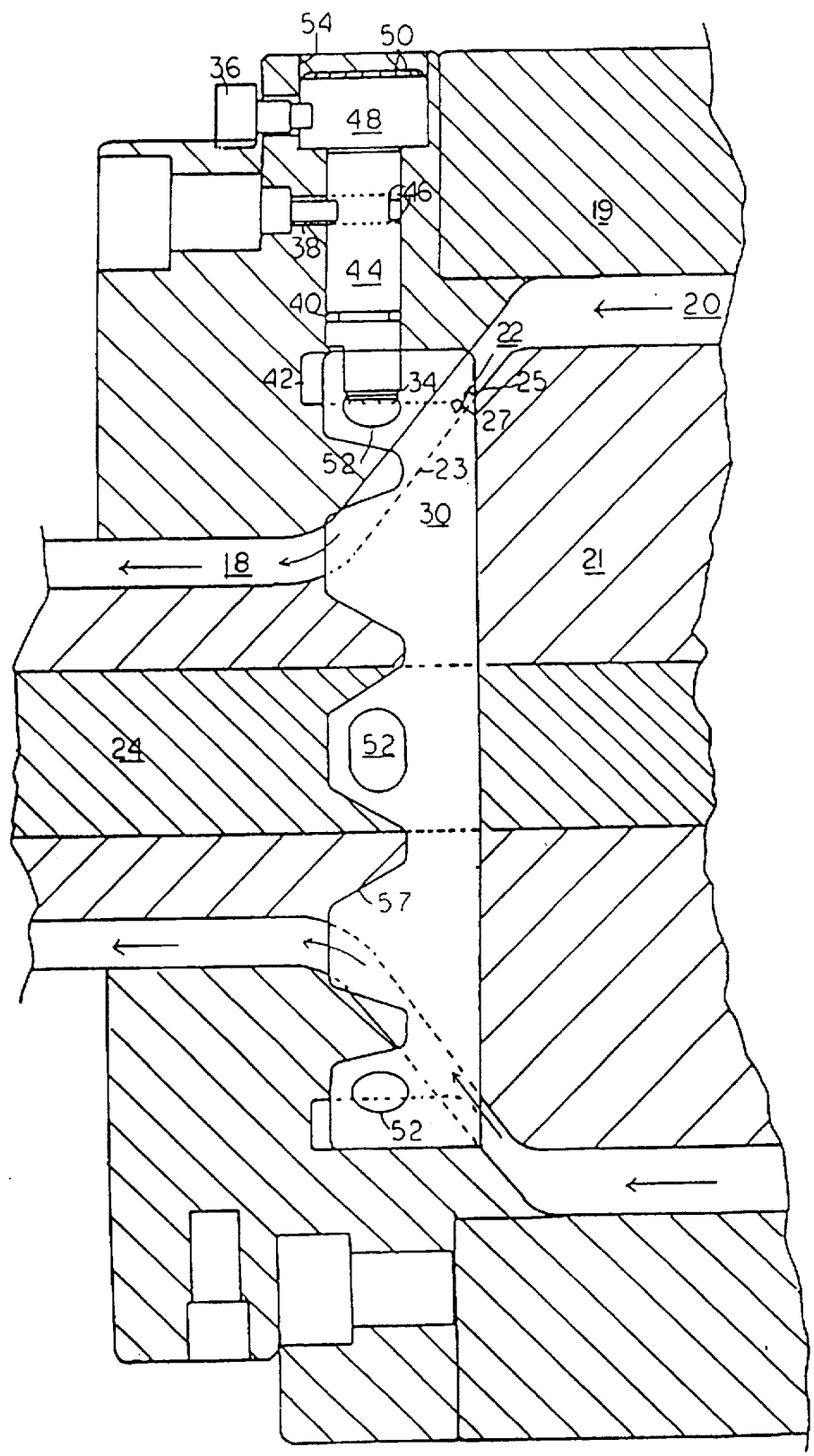
FIG. 3 is an enlarged side elevational view of the choke ring of FIG. 1.

FIG. 3 shows a side elevational view of the choke ring apparatus 30 with the annular ring having oval receiving holes 52 in selected segments of the castellated outer surface 57, to provide for axial, slidable movement of the choke ring 30 inwardly toward the inner wall 23 of the choke gap 22, creating a restricted flow area 25. The rounded inner surface 27 of the choke ring 30 is shown in position against the inner wall 23. The oval receiving holes 52 are spaced apart along the outer perimeter of the choke ring 30 on selected, alternating, outwardly extending castellations 57.

Figure 4:
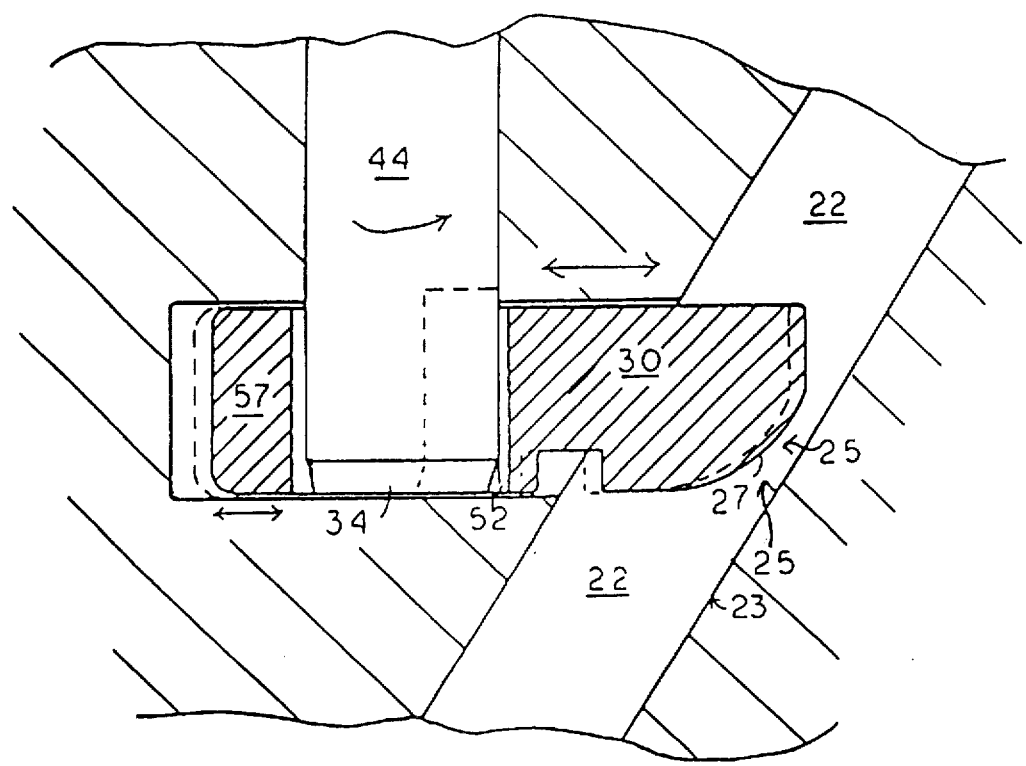
FIG. 4 is an enlarged, cutaway, detailed sectional view of the choke ring of FIG. 3 cut along lines 3—3.

FIG. 4 is an enlarged, cutaway, detailed sectional view of the choke ring 30 within the annular slot 42 and having eccentric bolt end 34 extending through the oval receiving hole 52. The oval receiving hole 52 is located on castellation 57. The choke ring 30 has on the inner surface adjacent the inner wall of the choke gap 23 a rounded surface 27. The rotational movement of the eccentric bolt end 34, and the axial movement of the choke ring 30 into the choke gap 22 creating a restricted flow area 25 caused by the turning of the bolt, are both indicated with arrows and broken lines.

Figure 5:
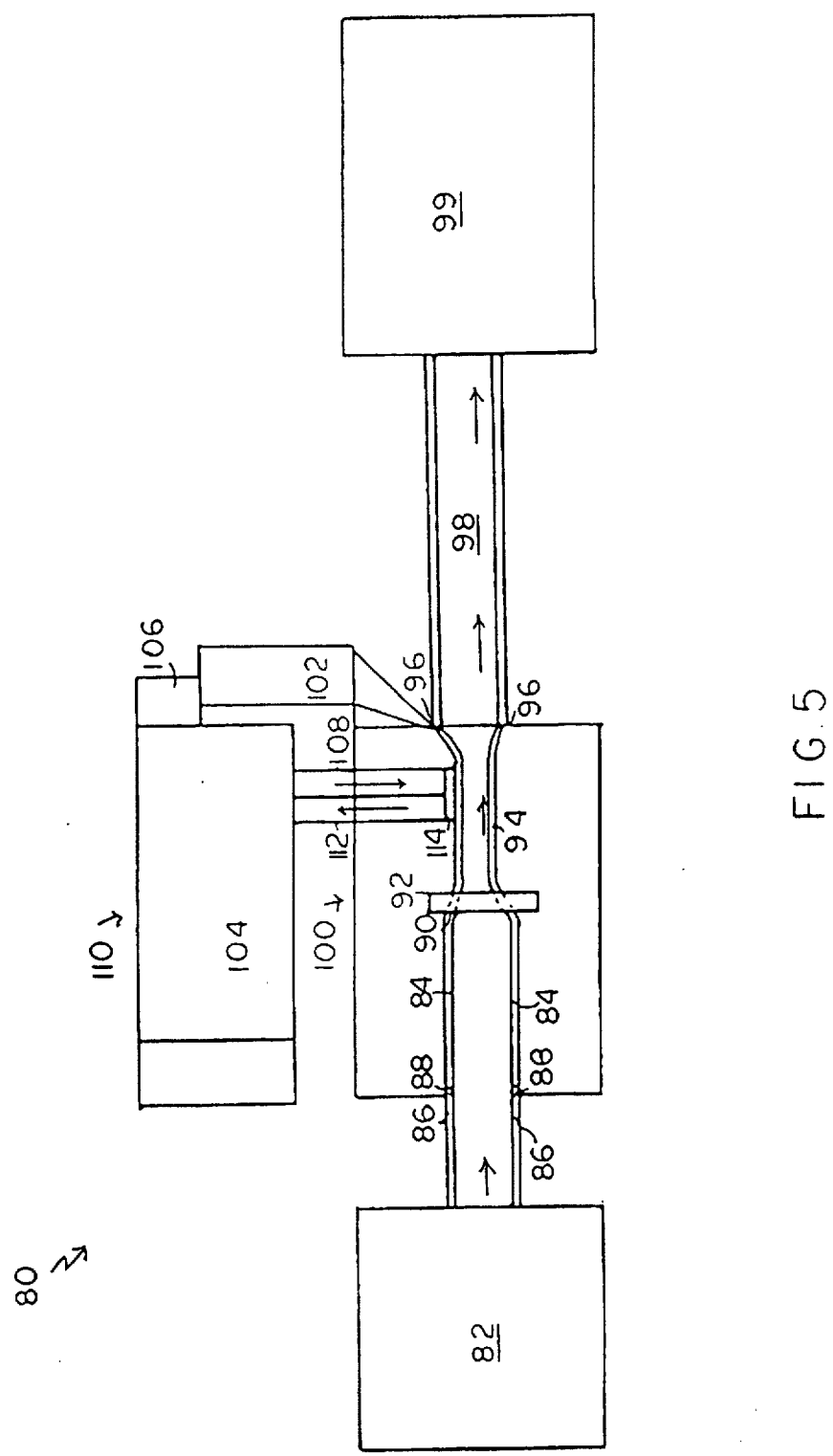
FIG. 5 is a schematic block flow diagram of the die apparatus of the invention in an extrusion die system.

FIG. 5 shows a block flow diagram of the choke ring apparatus 100 of the invention within a die extrusion system 80, with the thermoplastic material 82 entering the upper flow passageway 84 through the inlet 86 having the spider legs 88 thereon, and entering the choke gap 90 with the choke ring 92, and passing out of the lower extrusion passageway 94 through the die gap 96. The extruded foam material 98 may then be cut or processed in further steps 99 as desired by the manufacturer.

The diagram also shows the outer die lip temperature adjustment apparatus 110 located adjacent the die gap 94. The temperature sensor 102 monitors the temperature of the material, and the control unit 104 regulates the oil circulating pump and temperature control means 106. The temperature controlled heat transfer oil is then passed through the oil circulating passageway 114 by means of flow channel inlet 108 and flow channel outlet 112.

In operation, a foamable, thermoplastic material enters the extrusion die apparatus of the invention 10 through inlet 28, passing through two or more spider legs 26 located at selected, spaced apart intervals around the upper extrusion passageway 20, which spider legs 26 connect the outer extrusion die assembly 19 to the inner core 24 of the extrusion apparatus 10. The foam material then passes into the choke gap 22, where the adjustable choke ring 30 is adjusted in an axial, slidable manner as desired inwardly toward the inner wall 23 of the choke gap 22 to reduce or enlarge the area of the choke gap 22, controlling the flow of the foam material as desired. This flow control enables the user to reduce any spider marks on the finished foam material caused by the spider legs 26 at the inlet of the extrusion die apparatus, and also allows for better control of the pressure drop within the choke gap passageway by controlling the flow and distribution of the thermoplastic material.

The choke ring apparatus 30 is concentrically positioned about the die gap 22 within annular slot 42, and the plurality of eccentric, adjusting bolt head 34 adjacent the choke ring castellations 57 are spaced apart in a concentric manner adjacent the oval receiving holes 52 on the choke ring to permit the independent adjustment of various selected segments of the concentric choke ring 30 and concentric choke gap 22 as desired. The controlled flow then passes through the restricted choke gap area 25 to the lower extrusion passageway 18, where the flow is further adjusted by the heat transfer oil circulating passageways 70 in the outer die lip 12. These passageways are in a heat-conductive relationship with the outer die lip 12 to allow for an increase or decrease in the flow rate of the thermoplastic material as desired, depending on the temperature of the oil being circulated.

The outer die lip temperature adjustment means 70, with a plurality of valve passageways 72 having a heat transfer oil therein and having an inner circumferential surface 74 about and in a heat-conductive relationship with the outer die lip 12, can also be adjusted independently. Each temperature control means 70 has annular first and second flow channels 77 and 78 for the circulation of heat transfer oil, an oil inlet 79 for introduction into the first channel 77, an oil circulation passageway 74 for the circulation of heat transfer oil therein, and an oil outlet 73 for the withdrawal of circulated oil from the second channel 78. A control valve means 71 allows for the independent adjustment of each oil passageway 70.

The foam material then is extruded out of the lower extrusion passageway 18 through the die gap 16, which forms the thermoplastic foam material into a sheet of a desired thickness for further processing.

The adjusting bolts of the invention 32 are located in a plurality of separate, spaced apart bolt passageways 54 that extend through the outer die lip assembly 19 and into an annular slot 42 to the selected oval receiving holes 52 on the outwardly extending, regularly spaced apart choke ring castellations 57. Each of these bolts have a bolt head 48 on one end with markings 50 thereon to indicate to the user the location of the eccentric end 34 of the bolt 32 within the oval bolt receiving hole 52. The position of the eccentric end 34 determines the location of each section of the choke ring 30 within the choke gap 22. A turning bolt 36 on the outer edge of the bolt head 48 provides for the adjustment of the bolt 32. A securing bolt 38 located in a snug-fit, secure position within a groove 46 on the bolt neck 44 prevents the forcible ejection of the bolt 32 from the passageway 54 due to the foam pressure within the die apparatus. An o-ring seal 40 prevents leakage of fluid in or out of the bolt passageway 54. The castellations 57 further provide for the absorption of metal tension when the choke ring is adjusted and flexed.

In the illustrated embodiment, a plurality of eccentric adjusting bolts 32 are placed concentrically around the periphery of the choke ring 30 in a spaced apart, alternating manner adjacent oval bolt receiving holes 52 within selected castellations 57 to allow for the specific and individual adjustment of various selected segments of the choke ring 30 as desired. For example, if the spider legs 26 located at the inlet of the die apparatus are causing spider marks on the extruded material within the upper extrusion passageway 20, the choke ring 30 can be adjusted at the corresponding location within the choke gap 22 to decrease the size of the choke gap 22 to provide for the redistribution of the foam and elimination of the spider marks. In a similar manner, the areas that are unaffected by the spider legs can be adjusted according to the user's requirements. These adjustments can be made in preselected increments as desired by the user, but are usually in increments of up to 0.25 of an inch as desired.

Also in the illustrated embodiment, the flow of the thermoplastic material is further controlled by the heating or cooling by heat transfer oil within oil circulating passageways 74 adjacent the inner wall of the outer die lip adjacent the lower extrusion passageway 18. The foam material is heated or cooled by the circulation of temperature-controlled heat transfer oil through oil circulating passageways 74 located in selected, concentric, spaced apart sectors about the periphery of and adjacent to the heat-conductive outer die lip 12. These spaced apart oil circulating sectors can also be individually adjusted to allow for the specific adjustment of the temperature, and resulting density of the foam material passing therethrough.

Thus, the adjustable choke ring apparatus and extrusion system of the invention provides for a method wherein the choke gap area may be easily and effectively adjusted in size at various independent and specific points along the concentric perimeter of the die gap area, to allow for a smoother flow of the thermoplastic material through the extrusion die gap apparatus, resulting in an improved, smooth, unmarked sheet of extruded thermoplastic foam material for further processing by the user.

What is claimed is:

1. A method of extruding a thermoplastic material employing an extrusion die apparatus having an inner and outer die lip and a first and second end, which forms at said first end a die gap for the extrusion of said material, and forms a generally axial thermoplastic flow passageway from said second to said first end, the flow passageway having a choke gap with a cross sectional area, and which method comprises:

adjusting said choke gap cross sectional area at a plurality of sections about the periphery of said choke gap, by slidable, axial movement of a peripheral choke ring means having a face section and a rear section within a slot adjacent said choke gap by radially moving one or more of radially positioned choke ring adjusting means about the outer periphery of said choke ring means to move axially said choke ring means in said slot between a choke gap non-restrictive position and a selected choke gap restrictive position in the choke gap.

2. The method of claim 1 which includes adjusting said choke ring means by axial movement up to about 0.25 inches into said choke gap.

3. The method of claim 1 which includes flexing the periphery of the choke ring means in said slot in one or more of said sections to provide for peripheral adjustment of the concentricity of the choke gap and the extruded material.

4. The method of claim 1 which includes adjusting said choke ring means by a plurality of separate, adjustable, eccentric bolts about the radial periphery of said choke ring means.

5. The method of claim 3 which includes flexing in the slot of up to about 0.030 inch.

6. The method of claim 1 wherein said thermoplastic material comprises a foamable polystyrene or polyethylene thermoplastic material.

7. The method of claim 4 which includes 2 providing position marking indicators for each choke ring adjusting means and adjusting the choke ring means employing said indicators.

8. The method of claim 1 which includes adjusting said choke ring means by employing as the radially positioned choke ring adjusting means a plurality of spaced apart, eccentric, threaded bolts which extend through holes in the choke ring means to adjust axially and to flex said choke ring means in said choke gap.

9. The method of claim 1 wherein the choke ring means comprises a plurality of spaced apart castellation elements and which method includes axially adjusting and flexing said castellation elements in selected sections of said choke gap.

10. The method of claim 9 wherein said castellation elements have holes therein and which method includes:

a) employing as the radially positioned choke ring adjusting means a plurality of adjustable, threaded, eccentric bolts about the periphery of said choke ring means;

b) extending one end of said bolts into said holes; and c) axially adjusting and flexing said choke ring means in sections of the choke gap by threadable adjusting of the position of said bolts.

11. The method of claim 1 wherein said choke ring has a curved face section, which curved face section extends into said choke gap in the gap restrictive position to chance the cross sectional area of the choke gap, and which method includes axially adjusting said choke ring means in a direction facing the direction of extrusion of said thermoplastic material in the thermoplastic flow passageway.

12. A method of extruding a thermoplastic material employing an extrusion die apparatus having an inner and outer die lip and a first and second end, which forms at said first end a die gap for the extrusion of said material, and forms a generally axial thermoplastic flow passageway from said second to said first end, the flow passageway having a choke gap with a cross sectional area, and which method comprises:

a) adjusting said choke gap cross sectional area at a plurality of sections about the periphery of said choke gap by slidable, axial movement of a choke ring means within a slot having a selected clearance, said choke ring comprised of castellation elements with holes therein, the choke ring means adapted to move axially between a choke gap non-restrictive position and a choke gap restrictive position; and b) adjusting said choke ring means by employing a plurality of radially positioned, spaced apart, eccentric, threaded bolts having one end extending into the holes of the castellation elements to adjust axially and to flex said choke ring means in said choke gap by threadable movement of said bolts.

13. A method of extruding a thermoplastic material employing an extrusion die apparatus having an inner and outer die lip and a first and second end, which forms at said first end a die gap for the extrusion of said material, and forms a generally axial thermoplastic flow passageway from said second to said first end, the flow passageway having a choke gap with a cross sectional area, and which method comprises:

adjusting said choke gap cross sectional area at a plurality of sections about the periphery of said choke gap, by slidable, axial movement of a choke ring means having a face section and a rear section and a plurality of spaced apart castellation elements at the rear section and axially moving said choke ring means within a slot having a selected clearance and adjacent said choke gap by axially moving said face section of said choke ring means between a choke gap non-restrictive position and a choke gap restrictive position and flexing said face section in said slot by moving said castellation elements.

14. The method of claim 13 which includes adjusting said choke ring means by adjusting one or more of a plurality of separate, adjustable, eccentric, threaded, spaced apart bolts radially positioned about the periphery of said choke ring means.

15. The method of claim 13 which includes axially moving said choke ring means in the choke gap of up to about 0.25 inch and flexing the said choke ring means in the said slot up to about 0.030 inch.

16. The method of claim 13 wherein said castellation elements have holes therein and which method includes:

a) employing a plurality of adjustable, threaded, eccentric bolts about the periphery of said choke ring means;

b) extending one end of said bolts into said respective holes; and c) axially adjusting and flexing said choke ring means in the choke gap by threadable adjusting of said bolts.

17. The method of claim 13 wherein said choke ring means has a curved face section, which curved face section extends into said choke gap in a choke gap restrictive position, and which method includes axially adjusting said curved face section of said choke ring means in a direction facing the direction of flow extrusion of said thermoplastic material in the thermoplastic flow passageway.

18. The method of claim 13 wherein the extrusion die apparatus comprises a generally horizontal die apparatus having a generally angular flow passageway which includes said choke gap and extending between generally axial flow passageways at each end and which includes adjusting the choke ring means generally axially within the angular flow passageway.

* * * * *